Dec. 23, 1958  J. A. WINKER  2,865,583
BALLOON MESSAGE RELEASE MECHANISM
Filed Sept. 6, 1955  2 Sheets-Sheet 1
FIG. 1
FIG. 2
FIG. 3
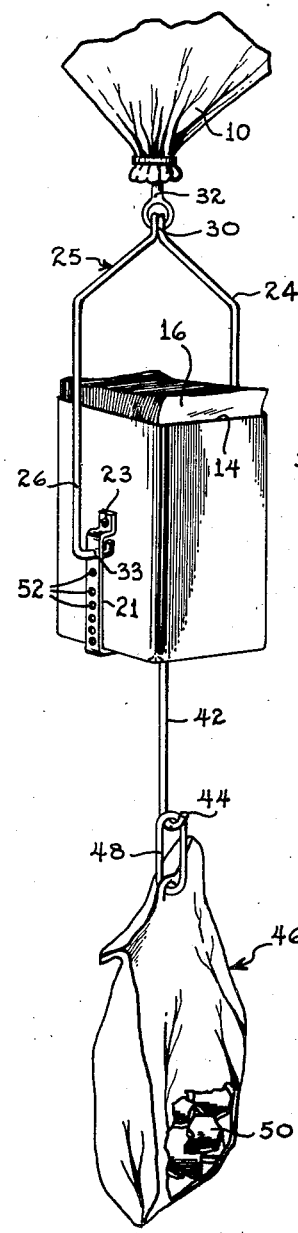
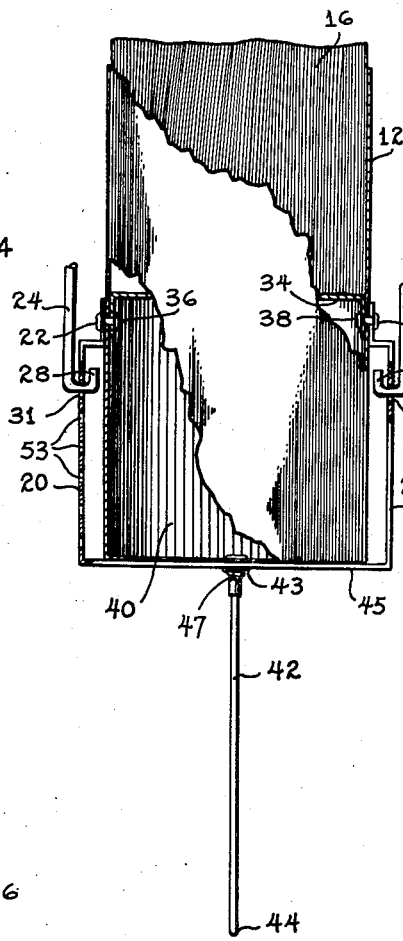
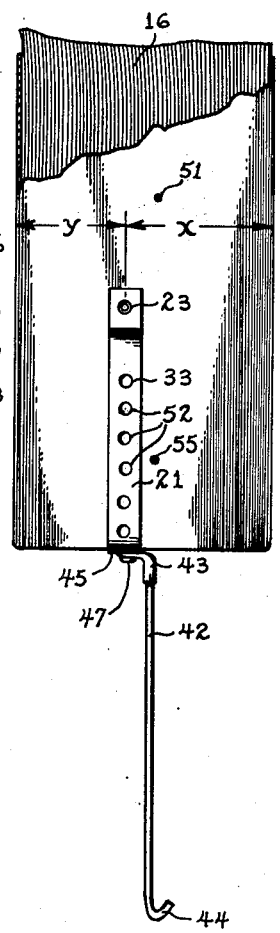
*INVENTOR.*
JAMES A. WINKER
BY
William C. Stueber
ATTORNEY Dec. 23, 1958   J. A. WINKER   2,865,583
BALLOON MESSAGE RELEASE MECHANISM
Filed Sept. 6, 1955   2 Sheets-Sheet 2
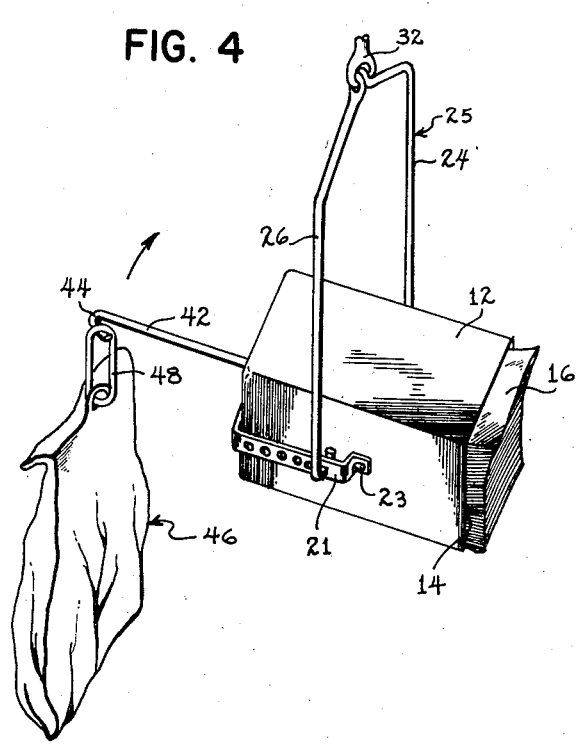
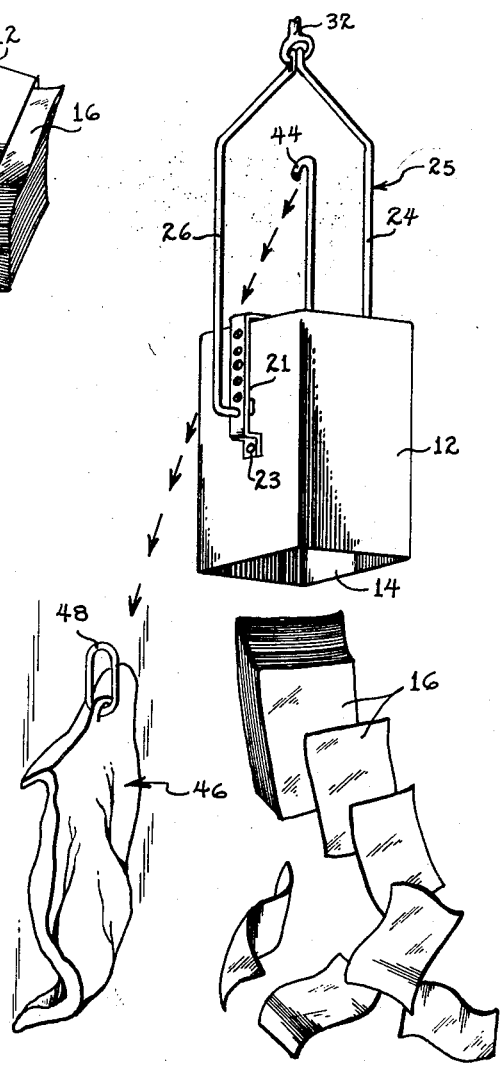
INVENTOR.
JAMES A. WINKER
BY
William C. Strueber
ATTORNEY

United States Patent Office 2,865,583
Patented Dec. 23, 1958

2,865,583

BALLOON MESSAGE RELEASE MECHANISM

James A. Winker, Arlington, Mass., assignor to General Mills, Inc., a corporation of Delaware Application September 6, 1955, Serial No. 532,714

3 Claims. (Cl. 244—137)

The present invention relates to a mechanism for supporting objects from a balloon in flight and dropping the objects from the balloon after a predetermined length of time.

Winds aloft will blow in predominantly one general direction at a given area. Also, by coordination of direction readings in different areas and at different altitudes, it is possible to ascertain the direction and speed of winds at various altitudes at given locations. Because of these determinable winds it is possible to launch balloons and determine to a relatively certain degree the ground location of the balloon in flight after a given period of time. The flight of the balloon may be controlled by determining the altitude to which the balloon will ascend and the rate of rise at which the balloon ascends to the altitude. The altitude is an important factor since these winds vary in speed of direction at different levels of altitude.

These winds have been taken advantage of in balloon flights for a number of purposes. One of the purposes has been the delivery of objects from one location to another by balloon. Objects such as messages may be sent aloft and dropped at a predetermined location, dispersing as they fall. The messages may be used for advertising or propaganda purposes and it will be apparent that this method of dissemination will have utility in both peace and war.

In most instances, it is not possible to recover the balloon. Where balloon materials are formed of light-weight plastic such as polyethylene, the material is expendable and it is less expensive to construct new balloons for each flight than to recover the old balloon. It is therefore expedient to use a very inexpensive message carrying and dropping apparatus for the balloon.

Where the messages or objects are to be dropped from the balloon at a certain location mechanism must be supplied which will support the messages from the balloon and drop them at a specified time. Since the balloon will not be recovered, it is important that the mechanism be inexpensive. It is, however, also important that the mechanism be reliable since the time of dropping the messages is important if they are to land in the proper location. It is also important that the mechanism be very simple and easy to handle so that a large number of balloons can be handled and launched with a minimum number of experienced personnel.

It is accordingly an object of the present invention to provide an improved carrying mechanism for supporting objects such as messages from a balloon in flight which will drop the messages from the balloon after a predetermined length of time.

It is another object of the invention to provide an apparatus for carrying messages from a balloon which is simple in construction and yet which obtains accurate and positive operation so that the messages will be positively dropped after a given length of time.

Another object is to provide a mechanism for carrying messages from a balloon which will, after a fixed length of time, discharge the messages rapidly to permit the messages to be scattered and yet drop them in a group so that they all will arrive at substantially the same location scattered over an area surrounding the location.

Another object is to provide an open container for supporting articles beneath a balloon which is pivotally supported at a point beneath the center of gravity of the loaded container and which carries a weight to lower the center of gravity with the weight being capable of being reduced and dropped to raise the center of gravity and automatically invert the container.

Another object is to provide a mechanism for dropping articles such as messages from a balloon after a predetermined time of flight in which the time may easily be varied.

Other objects and advantages will become more apparent from the following specification taken in connection with the drawings, in which Figure 1 is a perspective view of the apparatus for carrying messages from a balloon showing the balloon in flight;

Fig. 2 is a front elevation of the mechanism with portions in section to illustrate the details of construction;

Fig. 3 is a side elevational view with a portion of the container broken away to show the position of the messages therein;

Fig. 4 is a perspective view of the apparatus showing its action just before the messages are expelled from the container; and Fig. 5 is a perspective view illustrating the relative position of the parts just as the messages are dropped from the container and scattered.

As illustrated in Figure 1, the apparatus embodying the preferred embodiments of the present invention is supported from a balloon 10. Only the lower end of the balloon is illustrated but the balloon may be of any type sufficiently large to support the apparatus. Balloons of this type are preferably constructed of a light-weight plastic such as polyethylene and are filled with a lifting gas and closed at the bottom. The balloons may or may not be provided with an appendix or vent and are designed to ascend to a designated altitude where the winds are favorable for carrying it over the proper location for dumping the messages.

The articles which are shown in the form of messages but may be other objects are shown supported in a container 12 which is open at the top 14 so that the messages 16 may be placed therein. The messages are stacked or rest on their side as shown in the drawing in such a manner so that they will be dumped from the container 12 when the container is overturned or upended. The container, however, is supported from the balloon during flight in the upright position as illustrated in Figs. 1, 2, and 3.

A supporting bracket 20 and 21 extends down each side of the container and across the bottom. The ends of the bracket are connected to the container such as by rivets 22 and 23. For supporting the container from the balloon, a bail 25 having arms 24 and 26 extends down from the balloon with the hooked lower ends 28 and 29 projecting into holes 31 and 33 in the brackets 20 and 21 which are secured to the side of the container. The hooks 28 and 29 at the lower ends of the bail are turned upwardly at their inner ends so as to prevent the hooks from becoming accidentally disengaged from the holes in the brackets. The bail has a connection 30 at its upper end which extends and secures to the eyelet 32 which is provided at the bottom of the balloon for the purpose of supporting the payload.

The position of the holes 28 and 29, in which the lower ends of the bail extend to provide a pivotal support for the container, is important since the pivotal suspension point must be lower than the center of gravity of the container when it is filled with messages. In this location the container will automatically tip itself to an upside down position if no additional weight or means is provided to keep it upright.

In order to raise the center of gravity of the container a false floor 34 is provided so that the messages or objects carried by the container will remain at the upper end. This floor 34 is formed of a section of sheet metal extending across the center of the container and is connected at the side of the container such as by rivets 36 and 38.

As was described, the container is pivotally suspended on the bail and is unstable with its center of gravity being above the point of pivotal support shown at 33 in Fig. 3. The center of gravity for the filled container alone as shown in Fig. 3, would be approximately at 51. To prevent the container from accidentally inverting, a weight is suspended beneath the container. The center of gravity of the combination of the weight and container is approximately at 55, beneath the pivotal axis 23. The container will of course be tipped slightly when in flight so that the center of gravity 55 will be directly below the point of pivotal suspension 23 so that the assembly will be stable during flight.

For supporting the weight an elongated arm 42 extends from the bottom of the container and is connected at its upper end 43 to the container by rivet 47 projected through a hole in the center section 45 of the bracket members 20 and 21 which extends across the bottom of the container. The elongated arm is secured to the container by the rivet 47 which is upset within the container.

At the lower end of the extension arm 42 is a hook 44. This hook extends in a direction laterally of the pivotal support axis of the container which is defined by the location of the holes 31 and 33 in the bracket from which the pivotal container is suspended.

To maintain the container in an upright position, the weight shown generally at 46 is suspended beneath the container. The weight is provided with an elongated eyelet 48 at its top which is hung over the hook 44.

The weight 46 in this instance is in the form of a porous sack which contains dry ice 50. The sack is coarse in structure so that the dry ice may evaporate and the carbon dioxide may escape. As the ice evaporates, the weight of the sack suspended from the bottom of the container is reduced, and the weight is gradually reduced over a period of time until the container 12 begins to tip as is shown in Fig. 4.

Without the dry ice, the center of gravity 51 is above the pivotal axis of support of the container but with dry ice is below at 55. As the dry ice evaporates and the weight of the mass supported beneath the container is gradually reduced, the center of gravity of the assembly including the container, messages, and suspended weight moves upwardly until it approaches the pivotal axis of the container. Just as it reaches the pivotal axis, the assembly becomes unstable and the container begins to tip as is shown in Fig. 4. Therefore, the length of time that the container will remain in upright position and continue to support the messages 16 will be determined by the length of time it takes for the center of gravity to move up to be coincident with the pivotal axis of the container. This may be altered, of course, by changing the amount of dry ice supported in the sack 46 beneath the container. With less dry ice, the center of gravity of the unit as a whole will be higher and it will take less time for the center of gravity to move upwardly to the point where it is coincident with the pivotal axis of the container. The length of time of flight is controlled by the total weight of dry ice and the length of time of evaporation of the dry ice. This may be readily determined by computing the rate of evaporation of the dry ice which is dependent on the temperature in which the balloon will fly.

Another means is provided for changing the time of flight before which the messages will be dropped. This is provided structurally by the holes which are drilled down the sides of the brackets 20 and 21. The holes are illustrated at 52 in the bracket 20 and at 53 in the bracket 21. These holes are spaced beneath the holes 31 and 33. By removing the hook ends 28 and 29 of the bail from the hole 31 and inserting them in a set of the lower holes, the pivotal support axis of the container will be lowered and the distance between the pivotal axis and the center of gravity will thus be reduced. This means the the center of gravity will becomes coincident with the pivotal axis of the container at an earlier time insuring that the messages will be dumped earlier. This method of adjustment is handy in instances such as where a number of sacks of dry ice are provided of a given weight and re-weighing is not feasible. By using the same size sacks of dry ice, the time at which the messages will be dumped can be readily changed by changing the holes in which the lower ends of the bail are inserted. The lower the hole that is chosen, the shorter the time will be before the messages are dropped.

As viewed in Fig. 4, when the dry ice has evaporated sufficiently so that the container begins to tip, the messages will be in a position where they may be dumped from the container. It is desirable that the messages be dumped rapidly. The messages will disperse as they fall from the container to the ground. They should, however, all be dumped at once so that the dispersion will be centered around a certain location.

To accomplish this rapid dumping and also aid in the dispersion of the messages, the mechanism is designed to drop the weight completely when the mechanism reaches the unstable condition illustrated in Fig. 4. To accomplish this, a hook 44 projects laterally of the pivotal axis of the container so that as the container tips to its side as shown in Fig. 4, the loop 48 supporting the sack of ice will slide off the end of the hook 44 permitting the container to rapidly invert itself as illustrated in Fig. 5. The released sack of ice will fall to the ground and the messages will be dumped in a group from the container to disperse as they fall downwardly.

As will be noted from the drawings, it is important that the container always tip in the same direction or the weight will not fall from the open hook. To insure this, the side brackets 20 and 21 are attached at a point laterally spaced from the center of gravity 51 which is substantially at the geometric center of the container.

In other words, the bracket is attached by the rivets 22 and 23 so that it is closer to one side of the container than the other. As shown in Fig. 3, the distance X from one side of the container to the point of attachment 23 of the bracket is larger than distance Y which is the distance from 23 to the other side of the container. Thus the container will always tip in the direction of the center of gravity when moving from the upright to the inverted position.

pivotal suspension point causing the container to dip to sack, depending on the weight of messages and time of evaporation of the ice, or by changing the hole into which the hooked ends of the bail extend, the time at which the messages are dumped can be accurately chosen. By plotting the course of flight of the balloon according to the speed and direction of the winds during flight, the location at which the messages are dumped can be accurately chosen.

The mechanism for controlling the time of flight is simplified and inexpensive. No highly accurate parts need be constructed and the mechanism is sufficiently inexpensive to be expendable. The action of the dry ice is reliable and all of the apparatus is so constructed that it cannot be easily damaged by rough handling. This provides a considerable saving in time and expense over providing mechanical or electrical timers.

The bail can be constructed of firm wire, the container of light sheet metal or fiberboard and the sack of paper or burlap. All of these or equivalent materials are inexpensive and easily available in almost any location.

I have, in the drawings and specification, presented a detailed disclosure of the preferred embodiment of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim as my invention:

1. A mechanism for dropping articles from a balloon in flight comprising a container having an open top for containing a plurality of articles therein which are to be dropped from the balloon when the container is inverted to disperse themselves while falling, a pivotal suspension for the container positioned beneath the center of gravity of the loaded container so that the container will automatically upend itself when freed, a support positioned laterally of the center of gravity of the upright container so that the container will always tip in one direction from a vertical position, a hook projecting beneath the container for supporting a weight therefrom to shift the center of gravity of the weight and loaded container to a point below the pivotal suspension of the container, the hook projecting laterally in the direction from the pivotal suspension toward the center of gravity so that the open end of the hook will be facing downwardly when the container pivots in the direction of the center of gravity, and means for suspending a weight from the hook and adapted to permit reduction of the weight during flight so that the center of gravity will shift to a point above the pivotal suspension point causing the container to tip to a position where the weight will drop from the hook to permit the container to move rapidly to inverted position.

2. A mechanism for dropping articles from a balloon in flight comprising an open container for carrying the articles and for discharging the articles when the container is inverted, a suspension member adapted to be connected to a balloon and to be pivotally connected on an axis to the sides of the container, a series of vertically spaced suspension points along the sides of the container each adapted for connection to the suspension member to permit adjustment of the distance between the pivotal axis of the container and the center of gravity of the container, the pivotal suspension points being positioned beneath the center of gravity of the loaded container, and means for suspending a weight beneath the container so that the combined loaded container and weight have a center of gravity beneath the suspension axis of the container, said weight being reducible suspended beneath the container so that the center of gravity will move above the pivotal suspension point to permit the container to upend itself and discharge the contents.

3. A mechanism for dropping articles from a balloon in flight comprising a container for carrying articles from a balloon and for discharging articles when moved to inverted position, a pivotal suspension member adapted for attachment to a balloon to suspend the container therefrom and pivotally connected to the container at a point below the center of gravity of the loaded container and laterally of the center of gravity of the loaded container to insure that the container will tip in the direction of the center of gravity when released, means for supporting a weight beneath the container, the weight being reduced so that the center of gravity will move upwardly to approach the pivotal suspension point of the container, and means to drop the weight from the container when it has tipped a predetermined amount in the direction of the center of gravity.

References Cited in the file of this patent

UNITED STATES PATENTS

| 1,286,178 | Halsey | Nov. 26, 1918 |
| 1,598,211 | Maguire | Aug. 31, 1926 |

FOREIGN PATENTS

| 458,407 | Germany | Apr. 5, 1928 |

UNITED STATES PATENT OFFICE
CERTIFICATE OF CORRECTION

Patent No. 2,865,583                                          December 23, 1958

James A. Winker

It is hereby certified that error appears in the printed specification of the above numbered patent requiring correction and that the said Letters Patent should read as corrected below.

Column 4, line 60, strike out "pivotal suspension point causing the container to dip to" and insert instead the following as the beginning of the paragraph:

-- Thus by placing the proper amount of dry ice in the --.

Signed and sealed this 13th day of December 1960.

(SEAL)
Attest:

KARL H. AXLINE
Attesting Officer

ROBERT C. WATSON
Commissioner of Patents